INTERCOM SYSTEM IN WHICH MASTER STATION CONTROLS OPERATION OF STAFF STATIONS

Filed Feb. 18, 1966 2 Sheets-Sheet 2

INVENTOR
HOWARD M. SONTAG
BY
Burgess, Dinklage & Sprung
ATTORNEYS.

March 3, 1970 H. M. SONTAG 3,499,115

INTERCOM SYSTEM IN WHICH MASTER STATION CONTROLS OPERATION OF STAFF STATIONS

Filed Feb. 18, 1966 2 Sheets-Sheet 1

INVENTOR
HOWARD M. SONTAG
BY
Burgess, Dinklage + Sprung
ATTORNEYS.

United States Patent Office 3,499,115

Patented Mar. 3, 1970

3,499,115
INTERCOM SYSTEM IN WHICH MASTER STATION CONTROLS OPERATION OF STAFF STATIONS

Howard M. Sontag, Roslyn, N.Y., assignor to Executone Inc., Long Island City, N.Y.

Filed Feb. 18, 1966, Ser. No. 528,529
Int. Cl. H04m 1/00, 9/00
U.S. Cl. 179—1 4 Claims

ABSTRACT OF THE DISCLOSURE

An audio communication system disposed for operational control by one station and adapted for a 2-way communication between remotely located stations and other networks of similar design, the control by one station in the same network providing the same control between remote stations and remote networks. D.C. voltages are used to provide talk-listen, busy and priority signals.

This invention relates in general to communication systems and more particularly to an audio communication system adapted for transmitting two-way communications between remotely located stations over audio lines of relatively greater length than was heretofore feasible.

In general, the invention contemplates a system using two basic types of communication stations, each of which are adapted for reversible two-way audio communication, i.e. are capable of both transmitting and receiving communications, either simultaneously or alternatively, but preferably alternatively. One type of communication station may be appropriately designated as a master station since in the system of the invention, it is capable of initiating and controlling communications with stations of the other type, which can be designated as staff stations.

One of the objectives of the invention is to enable a "hands free" type of operation at the staff stations, and accordingly, the invention provides a switching command means operable at the master station to effect reversal of the audio communication direction at the staff stations automatically so that, without any manual switching action at the staff stations, two-way communication can be carried on between any staff station selected at a master station, with the talk-listen operations of the staff station being controlled at the master station.

While a simultaneous transmit and receive capability could be provided in the master and staff stations, in accordance with the invention, the system provides means whereby when a master station and a staff station are coupled to an audio line for mutual communication thereover, one station is in a transmit or talking state, and the other is in a receive or listening state. This is preferably because if both stations were to be in either the transmit or receive states, considerable interference would result and for practical communication purposes, such an arrangement would be unusable.

Because hands free operation at the staff station is desired, the system provides for maintaining the staff stations in a normal transmit state, and for switching the staff station into a receive state through a switching command signal applied at the master station. This is further advantageous because it allows the master station to initially listen on the staff station before applying a switching command signal to place such staff station in the receive state for listening to communications transmitted from the master station.

Essentially, the communication system of the instant invention includes circuit means defining an audio communication line, a master station and a staff station, both adapted for reversible two-way audio communication and coupled to the audio line for mutual communication thereover, a transmit-receive switching circuit means coupled to the staff station for reversing the audio communication direction thereof, in response to a switching command signal, and a switching command circuit means operable at the master station for applying such switching command signal to the transmit-receive circuit means.

The switching command signal is superimposed upon the audio line for transmission thereover from the switching command circuit means to the transmit-receive switching circuit means, and for such purpose, the switching command circuit means and the transmit-receive switching circuit means are both coupled to the audio line, so that the switching command signals can be superimposed thereupon by the former and sensed by the latter.

A party at the master station can call a party at the staff station simply by operating the switching command circuit means to place the staff station in the listen condition, and then speaking into the microphone, or reverse connected loudspeaker, etc. of the master station, with said master station being placed in the transmit condition during the time when the staff station is in the listen condition. To enable the called party at the staff station to answer, said staff station is restored to the transmit condition and the master station is returned to the listen condition.

Within the scope of the invention, the switching of the master station between the transmit and receive states can be effected either automatically or manually. However, the switching of the staff station into the receive state is effected automatically via the switching command signal, the control of which is maintained at the master station.

In accordance with one embodiment of the invention, the switching command signal is applied continuously during the time when the master station is in the transmit state to hold the staff station in the receive state, and the switching command signal is removed automatically when the master station is returned to the receive state with the transmit-receive circuit means at the staff station being responsive to such command signal removal to return the staff station to the transmit state automatically.

According to another embodiment of the invention, a pulse type switching command signal is applied initially to switch the staff station into the receive state when the master station is switched into the transmit state, and the staff station remains in such receive state after the command signal pulse expires and until a subsequent command signal pulse is applied. In this way, a flip-flop type of transmit-receive mode switching of the staff station is achieved. For example, with the staff station initially in the transmit mode and the master station initially in the receive mode, switching of the master station into the transmit mode results in applying a switching command pulse to place the staff station in the receive mode to allow transmission of communications thereto from the master station. When the master station is returned to the receive mode, another switching command pulse is applied to return the staff station to the transmit mode. Thus, the master and staff stations can be switched into respectively complementary audio communication direction modes without the need for continuously maintaining a switching command signal on the audio line.

The switching command signal can be expediently a DC voltage pulse, or a continuous DC voltage level, although by appropriate modification of the transmit-receive switching circuit means and the switching command circuit means, as will become apparent from the detailed description hereinafter, AC voltage levels and pulses can be used as well as to effect the same intended results.

While thus far, the system of the invention has been characterized in terms of a single master station and a single staff station, the invention, is by no means limited to such one line types of systems, but is equally applicable to communication systems wherein a plurality of master stations and a plurality of staff stations, not necessarily equal in number, are included.

For example, multi-station communication system in accordance with the invention can be constructed with a plurality of staff stations, each coupled to a separate corresponding audio line, and a plurality of master stations, each of which can be selectively coupled and decoupled from any given audio line so as to accommodate communication between any selected combination of a master station and a staff station, or between any selected pair of master stations over corresponding additional audio lines provided for communication between master stations.

In such an arrangement, it is desirable, if not essential, to prevent the coupling of a third station onto an audio line to which two other stations are already coupled for mutual communication.

As provided by the invention, the staff stations are normally coupled to respectively associated audio lines and the selective coupling of the master stations to such audio lines is accomplished by a coupling-de-coupling circuit means associated with each individual master station. Thus, any master station by operation of its coupling-decoupling circuit means can be coupled to the audio line pertaining to a selected staff station for communication therewith, and can be decoupled from such audio line to render same available to another master station which can then be coupled thereto for communication with the same staff station. To prevent cross talk and to achieve greater privacy, the invention provides a busy indicator circuit means which is coupled to the audio line and to the coupling-decoupling circuit means to superimpose a predetermined busy signal on the audio line when a master station is coupled thereto, and to inhibit the coupling of a master station to an audio line if such coupling is attempted where a similar busy signal is already superimposed upon that line as a result of another master station being coupled thereto for communication with the staff station. Such busy indicator lockout function is preferably accomplished by providing each master station with a busy indicator signal circuit which applies the busy signal to the selected audio line upon coupling of the master station thereto by its associated coupling-decoupling means, if such coupling can be effected without inhibition as where another master station is already coupled to the same audio line and has superimposed its own busy signal thereupon by means of its associated busy indicator signal circuit.

The coupling-de-coupling circuit means in responsive to the presence of a previously superimposed busy signal upon an audio line to inhibit the coupling of its own master station thereto, but, of course, is not responsive to de-couple its own master station upon sensing the busy signal superimposed as a result of such station being coupled to the audio line.

Although the busy lockout function provided by the invention can be implemented through a variety of circuits, the coupling-de-coupling and busy indicator signal circuits associated with each master station must essentially operate to sense the presence of a busy signal superimposed by another master station on the audio line pertaining the staff station selected by a given master station, such busy signal sensing being performed before the given master station is coupled to the audio line. If such a busy signal is present on the line, the given master station is not coupled thereto. If no busy signal is on the line, the given master station is coupled thereto for communication with the intended staff station. To prevent other master stations from subsequently coupling to the same line while it is being used by the given master station, the busy indicator signal circuit associated therewith superimposes a busy signal on the line. This allows two-way communication between the given master station and the staff station selected thereby without interference with other master stations. Since a similar type of busy signal is applied to an audio line when any master station is coupled thereto, it follows that once a master station is coupled to an audio line, no de-coupling therefrom results from the busy signal, but rather the coupling of an additional master station is inhibited.

Preferably, the busy signal, like the switching command signal is a DC voltage, but in the case of the busy signal, a steady DC voltage level is most favorable because for continuous interference protection, it is necessary to indicate the existence of the busy condition continuously throughout the duration of master station coupling to an audio line, whereas DC voltage pulse type switching command signals can be used. To prevent signal confusion, when using a DC voltage level busy signal, the switching command signal DC voltage is preferably the same polarity as that of the busy signal, but greater in magnitude. Hence, a minus 12 volt DC level can be used as a busy signal, and a minus 24 volt DC voltage, either constant level, or pulsed, can be used as the switching command signal.

In such case, the coupling-de-coupling circuit means can be made responsive to negative DC voltages within a range encompassing minus 12 volts DC to minus 24 volts DC to inhibit coupling of additional master stations to an audio line having a superimposed DC voltage within such range. To assure a reliable determination of a non-busy condition on the audio line, such non-busy condition is preferably indicated as a fixed DC impedance reference condition of the line, such as by grounding the line for DC, or by superimposing a distinctive characteristic voltage thereupon. Of course, when the line is placed in a busy condition, such non-busy indicator conditions are replaced by the busy signal.

With such a system, there is no predetermined order of priority established among the various master stations with respect to the use of the audio lines corresponding to the various staff stations, and hence, communication with any individual staff station is on a first-come, first-served basis. This of course, does not mean that in the system of the invention, there can be no priority control given to any master station.

For example, if it is desired to provide one or a limited group of master stations with the capability of coupling onto busy audio lines, and also with the capability of de-coupling a prior coupled master station from the line, such can be done by making the coupling-de-coupling circuit means associated with the non-priority master stations responsive to the presence of a priority command signal superimposed upon the line to de-couple such non-priority stations from the line. For example, with a minus 12 volt DC busy signal, a minus 24 volt DC switching command signal already provided by the system, a minus 36 volt DC priority command signal can be used to effect such de-coupling of a non-priority master station, in order to render such line available for use by a priority master station. In such case, the coupling-decoupling circuit means associated with the non-priority master station would be responsive to a minus 36 volt DC priority signal imposed upon the audio line by a majority command circuit means of a priority master station to de-couple the non-prority station from the line.

As can be appreciated by the artisan from the foregoing, the invention provides a communication system wherein a plurality of signals can be superimposed upon the same lines used for audio communication to effect various intended control functions relating to the operation of staff stations, and to other master stations as well.

It is therefore, an object of the invention to provide an audio communication system wherein the operation of its various communication stations can be controlled by means of signals superimposed upon the same lines used for audio communication purposes.

Another object of the invention is to provide a communication system as aforesaid wherein two-way communication can be accomplished between selected pairs of stations.

A further object of the invention is to provide a communication system as aforesaid wherein the selection of such two-way communication is effected at one station of a pair, designated as a master station, with the operation of the other station, or staff station, being controlled at the master station by superimposed signals.

A further object of the invention is to provide a communication system as aforesaid wherein such two-way communications can be carried on without interference from third stations.

A further object of the invention is to provide a communication system as aforesaid wherein mutual communication between a master station and a staff station can be carried on without manual control at the staff station.

A further object of the invention is to provide a communication system as aforesaid wherein an annunciator signal can be transmitted to the called station.

A further object of the invention is to provide a communication system as aforesaid wherein the audio level at the various stations can be regulated independently.

Still another and further object of the invention is to provide a communication system as aforesaid wherein communication can be accomplished by the transmission of low level audio signals over relatively long lines without any interference between such audio signals and control signals superimposed on the same lines.

Other and further objects and advantages of the invention will become apparent from the following detailed description and accompanying drawings in which.

Figure 1:
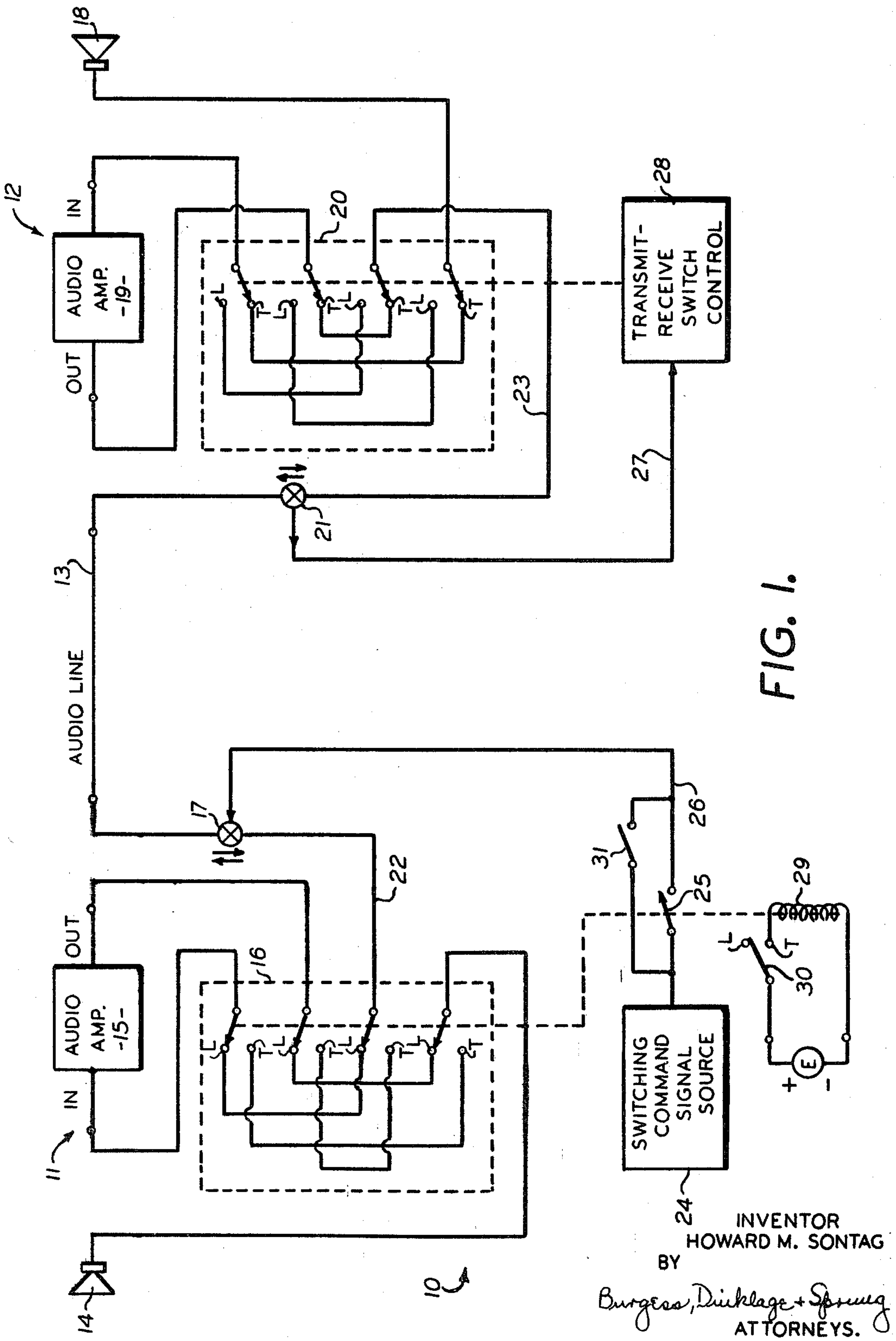
FIG. 1 is a schematic block diagram illustration of a communication system according to a preferred embodiment of the invention.

Referring now to FIG. 1, the communication system 10 represents a simplified embodiment of the invention wherein the transmit-receive mode switching of a staff station 12 is controlled at a master station 11 both of which are adapted for reversible two-way audio communication over a common audio line 13 to which they are coupled.

Each of the stations 11 and 12 are somewhat similar and hence the terms "master" and "staff" applied to designate them are only for purposes of identification herein. In practice, the stations 11 and 12 can be modular units.

Station 11 comprises a reversibly operable sound transducer, preferably a loudspeaker 14, an audio amplifier 15, a transmit-receive switching circuit 16, and a dual input coupling means 17. Station 12 comprises a reversibly operable sound transformer in the form of a loudspeaker 18, which is preferably similar to the loudspeaker 14, an audio amplifier 19, a transmit-receive switching circuit 20, and a dual output coupling means 21.

For simplification, the circuits and elements shown in FIG. 1 are represented as single conductor lines and two-terminal devices, it being understood that in actual practice they will be actually multi-conductor lines and multi-terminal devices, some lines and terminals of which will be connected to a common ground.

At station 11, the loudspeaker 14, the audio input-output line 22, the amplifier 15 input and output are coupled to corresponding switch arms of the transmit-receive switching circuit 16. These switch arms are disposed for operation in unison so that all four of them will be either in a talk position T or in a listen position L at any given time. As will be described in detail hereinafter, it is advantageous to use a transmit-receive switching circuit 16 wherein the switching arms are normally in the listen position L, and to use a transmit-receive switching circuit 20 for station 12 which has switch arms that are normally in the talk position T.

Within the transmit-receive switching circuit 16, each switch arm is provided with a set of associated contact terminals corresponding to the talk and listen positions T and L, and these contact terminals are electrically connected to one another so that when the switch arms are in the listen position L, an incoming audio signal carried on the input-output line 22 is applied to the input of amplifier 15 and the output of amplifier 15 is coupled to the loudspeaker 14 to audibly reproduce such incoming audio signal. When the transmit-receive switching circuit 16 switch arms are thrown to the talk position T, the loudspeaker 14 is coupled to the input of amplifier 15 and the output of amplifier 15 is coupled to the input-output line 22 to deliver audio signals to the audio line 13.

The transmit-receive switching circuit 20 associated with station 12 has similarly connected contact sets which couple the audio input-output line 23 thereat to the input of amplifier 19, and the output of amplifier 19 to loudspeaker 18 when its switch arms are in the listen position L, and couple the input-output line 23 to the output of amplifier 19 and the loudspeaker 18 to the input thereof when the switch arms are in the talk position T.

To avoid the futility of having both stations 11 and 12 placed concurrently in either a talk or a listen position, their respective transmit-receive switching circuits 16 and 20 are arranged for complementary operation, preferably with switching circuit 16 being disposed in a normal listen position L and switching circuit 20 being disposed in a normal talk position T. Since station 11 is to be the controlling station, such a transmit-receive switching arrangement offers the advantage of allowing station 11 to listen in on station 12 before initiating transmission of any communication thereto. Also, with the control of talk-listen changeover at station 12 being retained solely by station 11, such transmit-receive switching arrangement prevents station 12 from listening in on station 11.

Control over the talk-listen operation of station 12 is accomplished by a switching command circuit means disposed for operation at station 11 and a transmit-receive switching circuit means conveniently disposed at station 12. The switching command signal source 24 which produces a predetermined switching command signal, and a command switch 25 synchronously operate with the switch arms of switching circuit 16 to apply the command signal to a command line 26. The command line 26 is operatively connected to the coupler 17 to superimpose the command signal upon the audio line 13 along with any audio signal which might be present thereon by reason of the connection of said coupler 17 to the audio input-output line 22. The command signal is transmitted over the audio line 13 to another coupler 21, which functions as a command signal separator in that said coupler 21 allows two-way transmission of audio signals between the audio line 13 and the input-output line 23 but delivers the command signal to a command reception line 27 for application thereby to a transmit-receive switch control 28.

The switch control 28 is operatively connected to the switching circuit 20 and in combination therewith defines a transmit-receive switching circuit means coupled to station 12 for reversing the audio communication direction thereof, and which is coupled to the audio line 13 via coupler 21 to sense the switching command signal superimposed thereupon and to effect such communication direction reversal in response to the command signal.

Hence, with station 11 initially in the listen mode of operation, and station 12 in the talk mode of operation, closure of switch 25 effects a changeover of station 12 to the listen mode of operation. Since it is desirable to also effect a complementary changeover of station 11 to the talk mode of operation whenever station 12 is placed in the listen mode, the switch 25 is preferably coupled to the switch arms of switching circuit 16 for simultaneous operation therewith. This can be done simply by using a commonly operable, i.e. single lever mechanical switch (not shown), or by using a common relay 29 controlled by a single switch 30 to manipulate the switch arms of switching circuit 16 simultaneously with switch 25.

At station 12, the transmit-receive switch control 28 operates to place the switch arms of switching circuit 20 in the listen position L when the switching command signal is thus automatically transmitted to said control 28 by operation of switch 30. The detail circuitry of the switch control 28 will in general depend upon the characteristics of the command signal.

For example, where the switching command signal is a DC voltage level sufficient in load capability to operate a relay, the control 28 can simply be the coil of such a relay (not shown) and the switching circuit 20 can be the interconnected contacts and arms of such relay. In general, the output element of control 28 can be most expediently a relay (not shown) which is connected for operation to appropriate input circuitry (not shown) that provides a suitable voltage for relay operation upon application of the original command signal to such input circuitry. For example, the control 28 can be composed of a relay (not shown) requiring a 12 v. DC coil voltage for operation, and any circuit means (not shown) connected to the coil of such relay and to the command reception line 27 that will supply 12 v. DC for energizing the relay coil when the command signal is present, and which will permit de-energization of the relay coil in the absence of a command signal, can be used.

While in general almost any type of switching command signal can be used in the communication system 10 of the invention, provided that such chosen command signal does not so resemble an audio communication signal as to cause confusion at the coupler 21 or any otherwise undesirable interference effects, a fixed DC voltage level offers the simplest and probably the best choice for a command signal. Other types of potentially useable command signals are pulsed DC voltages, and high frequency AC voltages (above the audible range of frequency). However, the use of AC or rapidly pulsed DC voltages will introduce certain complexities into the communication system 10 because of their inherent Fourier component characteristics.

As will appear hereinafter in connection with FIG. 2, a 12 v. DC switching command signal (fixed level) offers several advantages in a solid state circuit communication system 10. Actually, having selected a fixed DC voltage level type command signal, there still remains a choice as to whether such command signal is to be continuously applied by station 11 in order to hold station 12 in a selected mode of operation, or whether the holding of station 12 in such selected mode is to be accomplished only by an intial application of the command signal. Either choice can be made available in the communication system 10.

For example, if a 12 v. DC relay is used in the control 28, and such relay is directly operated by the command signal, it will be necessary to keep the command signal on the audio line 13 in order to prevent the relay from reverting to its de-energized state, i.e. switching circuit 20 in talk mode. This may not be desirable in certain applications because of the extra DC power which must be carried over the audio line 13.

By using a flip-flop type of control 28 including a relay operated by a flip-flop circuit, it is possible to apply a 12 v. DC (either positive or negative) pulse command signal at the beginning of communication transmission from station 11 in order to switch station 12 into the listen mode, and then to repeat such pulse at the end of transmission in order to switch station 12 back into the talk mode.

With pulse type command signals and a flip-flop control 28, the normal conditions of the switching circuits 16 and 20 can be easily interchanged simply by applying a command pulse from the source 24 by means of an independently operable bypass switch 31. Thus, with switching circuits 16 and 20 respectively set to normally hold station 11 in the listen mode and station 12 in the talk mode, closure of switch 31 for the duration of one command pulse will result in station 11 being set for normal talk mode operation and station 12 for normal listen mode operation. The original normal modes for stations 11 and 12 can be restored simply by closing switch 31 for the duration of a second pulse.

In general, the couplers 17 and 21 are circuits which respectively will allow audio signal transmission in either direction between the audio line 13 and the input-output line 22 of station 11, and the input-output line 23 of station 12, as indicated by the double arrows at couplers 17 and 21. In addition, the coupler 17 effects the superposition of a switching command signal applied by the command line 26 onto the audio line 13, and coupler 21 effects the extraction of the command signal from the audio line 13 and applies it to the transmit-receive switch control 28 via line 27. Thus, command signals need flow in one direction only with respect to couplers 17 and 21 whereas audio signals undergo bi-directional flow with respect thereto. The couplers 17 and 21 can each be constituted by transformers, such as the transformers **32*a* and 32*b* illustrated in FIG. 2, each of which have a center tapped winding connected to opposite ends of the audio line pair 13' in a simplex arrangement. With a transformer simplex arrangement, a two-conductor line 13' can serve for the simultaneous transmission of audio signals and DC signals without interference with each other because the DC signals are introduced and withdrawn at the center taps which are electrically balanced nodes for AC signals with respect to the end taps of the transformers and the audio line 13'** conductors connected thereto.

Figure 2:
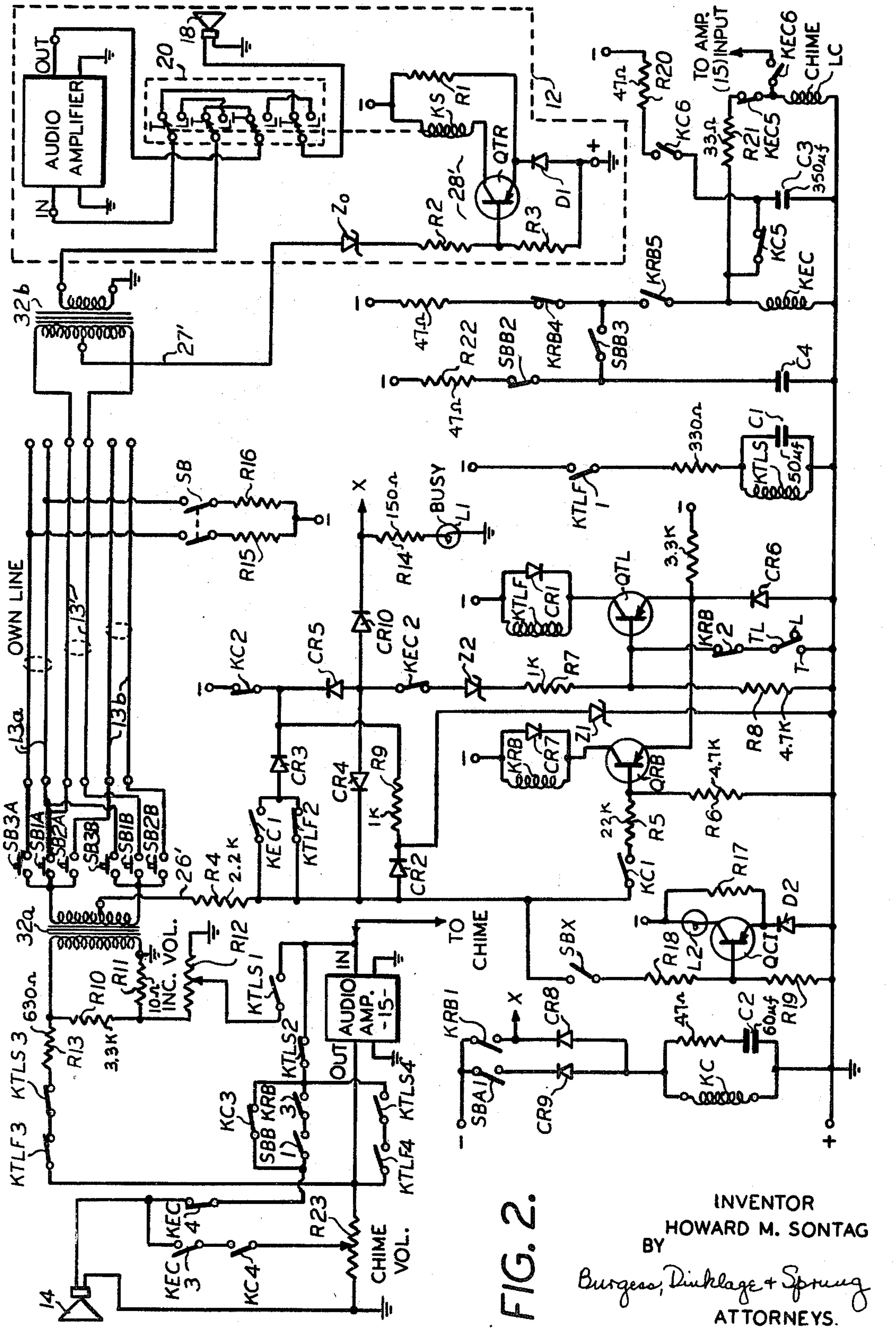
FIG. 2 is a schematic illustration of the communication system of FIG. 1 showing in greater detail typical circuit arrangements for effecting various control functions.

FIG. 2 shows a communication system 10' according to a preferred embodiment of the invention, and in somewhat greater detail. The communication system 10' includes several additional features such as busy condition controlled operation and an electronic chime enunciator signal system.

The communication system 10' contemplates the use of a normal 24 to 30 v. DC supply (not shown) for creating the switching command signal, busy signal, and various other voltages used throughout the circuitry shown in FIG. 2. For simplicity, only the terminal connections to the DC power supply are illustrated, with the positive terminal of such power supply being connected to a common ground line. The switching command signal is a negative DC voltage level equal to full power supply voltage, i.e. −24 v. DC. In addition, a −12 v. reference voltage is derived from the same power supply and applied to the audio line pair 13' to indicate a busy condition thereon and to activate circuitry associated with other master stations (not shown) to preclude them from actively interfering with communications on a busy line 13'.

In FIG. 2, the controlled, or staff station 12 is illustrated substantially the same as in FIG. 1, but with a transmit-receive switch control circuit 28' that is designed to ignore −12 v. DC busy signals and to operate whenever a normal −24 v. DC switching command signal is applied to the audio line 13'.

For such purposes, the control circuit 28' includes a relay KS having four sets of single pole double throw contacts interconnected as illustrated in switching circuit 20. When relay KS is de-energized, its contact sets hold station 12 in the talk mode of operation, and accordingly energization of relay KS converts station 12 into the listen mode of operation. The coil of relay KS is connected in series with a switching transistor QTR, the emitter of which is biased via a resistor R1 and diode D1 for current cut-off when its base is at ground potential. The base of transistor QTR is responsive to the switching command signal applied by line 27' through a series network including a Zener diode Z0 and resistors R2 and R3. Zener diode Z0 has a breakdown voltage of approximately 14 v. so that when a −24 v. DC switching command signal is applied to line 27' approximately 10 v. will be applied across the series combination of R2 and R3. Resistors R2 and R3 are selected in relation to each other so that when the 10 v. or more is applied to them in series, their junction which is connected to the base of transistor QTR, will have sufficient voltage to effect a saturation current conduction from emitter to collector in order to energize relay KS.

By choosing a Zener diode Z0 having a 14 v. breakdown, relay KS will not be energized falsely by a −12 v. DC busy signal which will appear on the same line 27'. Hence it is essential that Zener diode Z0 have a breakdown voltage which is reliably greater than the selected busy signal voltage and which is also reliably smaller than the switching command signal voltage.

The choice of a switching command signal having the same DC polarity but greater in magnitude than the busy signal is preferable because it simplifies discrimination between the two signals. The busy signal is applied continuously by the controlling station 11 during the time when said station 11 is connected to the same audio line 13' as is station 12, whereas the switching command signal is only applied intermittently when it is desired to reverse the audio communication direction of stations 11 and 12. Inherently, the audio line 13' is busy when the switching command signal is applied, as well as during times when the switching command signal is removed to permit talk mode operation of station 12. Accordingly, it can be said that a busy condition on the audio line 13' is represented by a DC voltage of 12 v. or greater in magnitude, whereas the switching command signal is represented only by full power supply voltage. When the normal −12 v. DC busy signal is applied to line 27', current flow therethrough to ground will be blocked by Zener diode Z0, and thus the base of transistor QTR will be effectively grounded to cut off current flow through relay KS coil.

In this respect, diode D1 is used simply as a voltage reference means, and could be replaced by a resistor (not shown). With the base of transistor QTR grounded during Zener diode Z0 current blocking, the approximately 0.6 v. drop across diode D1 serves to bias the base negatively with respect to the emitter to assure reliable collector current cut-off. One advantage of using a diode D1 lies in the fact that its voltage drop is fairly consistent regardless of current flow whereas the voltage drop across a resistor is dependent upon current flow therethrough.

Controlling station 11 can be selectively coupled to any one of a plurality of audio lines 13', 13*a*, 13*b*, each of which is defined by a pair of conductors. Such coupling is effected by closure of appropriate switches SB1A and SB1B to connect station 11 with the audio line 13' associated with station 12, switches SB2A and SB2B to connect station 11 with the audio line 13*b* associated with another station (not shown). Or switches SB3A and SB3B to connect station 11 to its own audio line 13*a*. Switches SB1A, SB1B, SB2A, SB2B, SB3A and SB3B are mechanically interlocked so that station 11 is normally coupled to its own line 13*a* to receive communications from other stations (not shown) having similar call selection capabilities, with the closure of any one pair of these switches associated with a selected audio line 13', 13*a*, 13*b* resulting in the opening of the other switch pairs. Thus, when station 11 is coupled to audio line 13' for communication with station 12, said station 11 is disconnected from its own line 13*a*, and likewise when station 11 is coupled to audio line 13*b* for communication with another station (not shown).

It should be noted that the coupling referred to in connection with switches SB1A, SB1B, SB2A, SB2B, SB3A and SB3B is essentially a station selection coupling and that additional switching connections are still required before any audio communication can take place between station 11 and the selected other station, for example station 12.

Station 11 is adapted to alternatively receive and transmit audio communications by the operation of switching contacts provided on relays KTLF and KTLS, which are in turn controlled by a talk-listen switch TL. Relay KTLF is a fast acting relay which when energized, activates the slower acting relay KTLS by closure of the contact set KTLF1. Although the single relay KTLF could be used in lieu of the additional sequentially operated relay KTLS, the provision of such relay KTLS facilitates the suppression of clicks and other transients which might be objectionable if relay KTLF were to be used alone. Relay KTLS is rendered slow acting by means of a capacitor C1, approximately 50 microfarads, connected in shunt with its coil, and a resistor of approximately 330 ohms connected in series with said coil.

It should be noted in connection with FIG. 2 that the various relay contact sets therein are illustrated in their respectively de-energized relay states, and in certain cases, will be actually in the opposite switching state when station 11 is in a standby condition preparatory to communication with station 12, since under standby conditions certain relays are energized.

For example, under standby conditions switch contact set SBA1 is closed thereby energizing relay KC which causes its associated contact sets KC1–6 to operate. Contact set KC1 effectively connects the base of a transistor QRB to the transformer 32*a* center tap line 26', via a network of resistors R4, R5 and R6. If line 26' has a negative voltage equal to or greater than 12 v., which corresponds to a condition wherein the audio line 13' is already busy as a result of being connected to another controlling station such as station 11, transistor QRB will be triggered into conduction, thereby energizing relay KRB. Otherwise, as when line 31', is free, the transistor QRB will not conduct and relay KRB will not be energized.

Assuming that line 13' is not busy, contact set KRB1 will remain in its normally open state since relay KRB is de-energized, and since SBA1 contact set is restored to open once the station 11 is removed from standby condition, relay KC will discharge its coil through a capacitor C2 (approximately 60 microfarads) within about 60 milliseconds, and thereafter will remain de-energized.

This results in contact set KC2 assuming its normally closed state to apply a nominal −24 volts DC to a series network including a diode CR5, a normally closed contact set KEC2, a Zener diode Z2, and resistors R7 and R8. As a result, transistor QTL is triggered into conduction by reason of its base connection to the junction of resistors R7 and R8. In turn relay KTLF is energized and its contact set KTLF2 (normally closed) is opened to prevent the application of −24 v. DC to resistor R4 which is in series with the center tap line 26'. It should be noted that contact set KEC1 will then be in its normally open state because relay KEC is not energized as contact sets KRB5 and KC6 will be normally open as relays KC and KRB are de-energized.

In addition, −24 v. DC is applied to a resistor R9 which is connected in series with a nominal 12 v. breakdown Zener diode Z1. The junction of Zener diode Z1 and resistor R9 is thus maintained at approximately −12 v. with respect to DC ground. This −12 v. DC level is applied to the center tap line 26' resistor R4 via a diode CR2 connected to the junction of R9 and Z1, and establishes a nominal −12 v. DC busy signal on the audio line 13' (less any small voltage drop through the resistor R4)

via the simplex connection through center tap line 26'.

Thus far, a busy signal has been applied to audio line 13', which was originally free, and relays KC, KRB and KEC are de-energized and relays KTLF and KTLS are energized.

Upon examination of the circuitry associated with the station 11 loudspeaker 14, and audio amplifier 15, it can be noted that with relays KTLF, KTLS energized and relays KC and KEC de-energized, the input of amplifier 15 is effectively connected to the station 11 side winding of transformer 32*a*, via the closure of contact set KTLS1 and the opening of contact sets KTLS2, KTLS3 and KTLF3, and the output of said amplifier 15 is effectively connected to the loudspeaker 14 through the closure of contact sets KTLF4 and KTLS4, and the normally closed contact sets KC3 and KEC4. Accordingly, station 11 is thereby placed in the listen mode of operation to receive incoming audio communications from station 12 which is in its normal talk mode of operation.

In connection with the foregoing, it should be pointed out that attenuation of the incoming audio signals to station 11 is provided by a fixed voltage divider network defined by resistors R10 and R11 and by an adjustable incoming volume control potentiometer R12 connected in series with the output junction of resistors R10 and R11 This gives a desirable control over incoming audio volume at station 11.

Should a party at station 11 desire to transmit audio communications to station 12, this can be done simply by closing the talk-listen switch TL and speaking into the loudspeaker 14 which then is connected to the input of amplifier 15 to serve as a microphone.

Upon closing the talk-listen switch TL, the base of transistor QTL is connected to ground and current conduction therethrough is cut off, thereby de-energizing relay KTLF and also in turn, relays KTLS, since contact set KTLF1 will be opened. De-energizing of KTLF will restore its contact set KTLF2 to its normally closed state, thereby replacing the previously established —12 v. busy signal on audio line 13' with a nominal —24 v. switching command signal. Since the cathode of diode CR3 is at —24 v. and the cathode of diode CR2 is held at —12 v. by Zener diode Z1, current conduction through diode CR2 is cut off and only diode CR3 is conductive.

The —24 v. switching command signal will be transmitted over the audio line 13' and via line 27' to trigger transistor QTR at station 12 into conduction and thereby effect operation of relay KS to switch station 12 into the listen mode to receive communications from station 11.

With relays KTLF and KTLS de-energized, their associated contact sets KTLS1, KTLS2, KTLF3, KLTF4, KTLS3, KTLS4, will be restored to their normal states indicated in FIG. 2. This results in the ouptut of audio amplifier 15 being connected to the station 11 side winding of transformer 32*a* via contact sets KTLF3 and KTLS3 through a series resistor R13, and the loudspeaker 14 being connected to the input of amplifier 15 for use as a microphone via closed contact sets KEC4, KC3 and KTLS2. Consequently, station 11 has been switched into the talk mode of operation and station 12 has been switched into the listen mode of operation as the result of applying a —24 v. switching command signal by closing the talk-listen switch TL.

In the event that when the standby switch SBA1 is restored to its open state, another station( not shown) similar to station 11 is using the selected audio line 13', whereby such use is indicated by either a —12 v. busy signal or a —24 v. switching command signal superimposed thereupon, such busy condition will result in a sufficiently negative voltage being applied via contact set KC1 to the base of transistor QRB which will trigger it into conduction, thereby energizing relay KRB. As a result, contact set KRB1 will close to maintain relay KC in a locked up energized condition via a series diode CR8.

With relay KC locked on, its contact set KC2 will open to remove the —24 v. from the cathodes of diodes CR3 and CR5, and from resistor R9. This prevents station 11 from applying either a —12 v. busy signal or a —24 v. switching command signal to the audio line 13', which is highly desirable if not absolutely necessary to prevent interference with other stations already using the line 13'. In addition, the contact set KC3 is opened to effect disconnection of the loudspeaker 14 hot line in order to prevent station 11 from either placing audio signals on line 13' or reproducing audio signal present thereon.

Indication of a busy condition on line 13' is made known to the operator at station 11 by means of a busy indicator L1 which is connected in series with a protective resistor R14 and which is operated by closure of contact set KRB1.

The invention provides a busy condition sensing and indicator means which is responsive only to busy conditions established by stations other than station 11 itself. This is accomplished by using a relay KC having its coil shunted by the capacitor C2 in order to initially hold said relay KC energized for approximately 60 milliseconds to sample the DC condition of the audio line. During this initial sampling period, contact set KC1 is closed to apply whatever DC voltage is present on line 13' to the base of transistor QRB. If there is no busy condition existing during the sampling period, relay KRB, will not be energized as transistor QRB will remain non-conductive, and accordingly the contact set KRB1 remains open to allow de-energization of relay KC at the end of the sampling period. Because contact set KC1 will be open at the end of the sampling period, any busy or switching command signal applied to line 13' thereafter will not cause relay KRB to become energized since emitter to collector current conduction in transistor QRB can only be effected when relay KC is energized, and then only if —12 v. or a greater negative voltage is on the audio line 13'. This is advantageous because it prevents another station from forcing station 11 off of line 13' in cases where station 11 is already connected thereto. Thus, in the communication system 10', the use of any particular audio line 13', 13*a*, 13*b* is on a first come first serve basis.

Should the audio line 13' be busy during the sampling period, contact set KC1 will remain closed by reason of the operation of relay KRB. This allows station 11 to camp on a busy line 13' waiting for it to become free. As soon as line 13' becomes available, the —12 v. or —24 v. busy or command signals originally present thereon will be removed, thereby causing emitter to collector current conduction in transistor QRB to become cut off, and relay KRB to de-energize. In turn, relay KC will become de-energized and station 11 will experience the same circuit conditions which would exist if coupled to a free line 13' originally.

In connection with the existence of a busy condition on line 13' during the sampling period, it should be noted that with relay KC held energized, relay KEC will not yet be energized so that the power supply negative voltage at the cathode of diode CR10 will be applied through contact set KEC2 to trigger transistor QTL into conduction and thereby place station 11 in a listen condition so that amplifier 15 can introduce no hum or noise onto a busy line 13'. Since with the operation of relay KRB, its contact set KRB2 opens, the listen condition established by a busy condition cannot be changed by inadvertently or intentionally closing the talk-listen switch TL.

The possibility that any current will be withdrawn from a busy line 13' is eliminated by a diode CR4, the anode of which is connected to receive the full power supply negative voltage, and the cathode of which is connected to the center tap line 26' through resistor R4. This assures that only the amount of current necessary to operate the base circuitry of transistor QRB will be taken from the line 26', thereby eliminating any loading effects which may tend to drop the busy signal or command signal voltage levels on the audio line 13'.

Another type of busy signal is provided by the invention for purposes of indicating to other stations (not shown) which might attempt to call station 11 over its own line **13*a* that said station 11 is already engaged in either actual or attempted communication with another station. This is done by applying a negative DC voltage, approximately equal to the full power supply voltage, to station 11 on line 13*a* via a simplex network defined by resistors R15 and R16, and through a double pole switch SB. As previously mentioned herein, whenever station 11 is coupled to either the audio line 13' or 13*b*, switches SB3A and SB3B, which serve to couple station 11 to its own line for receiving communications from other station (not shown) are opened so that station 11 becomes disconnected from its own line 13*a*. The operation of switch SB is slaved to the operation of switches SB3A and SB3B, and any appropriate conventional manner, so that when switches SB3A and SB3B are open, switch SB is closed, and vice versa. Hence, approximately −24 v. will be applied to line 13*a* whenever station 11 is engaged in communication with station 12, or with a station (not shown) coupled to line 13*b*. Although under such conditions, there will normally be no audio signals put onto line 13*a* by station 11, the station 11 is actually busy, and such busy condition is thereby indicated on line 13*a*** to other stations.

In the communication system 10', it is also possible for station 11 to be called by a similar master station (not shown) equipped with busy indicating and switching command circuitry. When station 11 is coupled to its own line **13*a*** by closure of switches SB3A and SB3B, the various standby switches SBB1, SBA1, SBB2, and SBB3 will be in their operate conditions rather than their respective normal conditions shown in FIG. 2.

Thus, switch SBA1 will be closed to maintain relay KC energized, which in turn will close contact set KC1 and open contact set KC2. Opening of contact set KC2 prevents station 11 from applying either its own −12 v. busy signal to audio line **13*a*, or its own −24 v. switching command signal thereto. The DC voltage on line 13*a*** whether it be a switching command signal of −24 v. or a −12 v. busy signal from the calling station will be applied to the cathode of diode CR4 and also to the base of transistor QRB through closed contact set KC1 and resistor R5.

When the calling station is first coupled to line **13*a*, its busy signal circuitry will superimpose a −12 v. level thereupon which will cause transistor QRB to conduct, thereby energizing relay KRB. This −12 v. will be insufficient to break down Zener diode Z2, and hence transistor QTL will be non-conductive since contact set KC2 is open. At this state, station 11** is in the talk mode of operation and therefore can reply immediately to the calling station.

The fact that another station is calling station 11 on its own line **13*a* can be visually indicated by a call indicator lamp L2 which is connected in series with the collector of a transistor QCI and to the negative side of the power supply. The emitter of transistor QCI is biased by the voltage drop across the diode D2 in series with a resistor R17, just as in the case of transistor QTR which is emitter biased by diode D1, and which transistors QRB and QTL which are emitter biased by a common diode CR6. The base of transistor QCI is coupled to the output of a voltage divider network defined by resistors R18 and R19, and the input to this divider network is connected to a switch SBX which is closed only when switches SB3A and SB3B are closed, i.e. when station 11 is coupled to its own line 13*a*. Preferably, switch SBX is slaved to operate with switches SB3A and SB3B. In effect, the call indicator circuitry associated with lamp L2 is only engaged when station 11 is coupled to its own line 13*a*, and in no way interferes with the previously described operation of station 11 when coupled to the station 12 via audio line 13'**.

When station 11 is called on its own line **13*a*, a −12 v. busy signal originating at the calling station is applied through switch SBX to trigger the transistor QC1 into conduction, thereby illuminating lamp L2 to signify an incoming call. Should the calling station apply a −24 v. switching command signal, the transistor QCI will merely be driven further into saturation conduction and lamp L2 will remain on while the calling station is coupled to line 13*a*. However, the application of a −24 v. switching command signal to line 13*a* by the calling station will result in breakdown of Zener diode Z2 and triggering of transistor QTL into conduction, thereby energizing relay KTLF and in turn, relay KTLS to place station 11** in the listen mode.

It should be noted that because relay KRB has already been energized as a result of the −12 v. busy signal applied by the calling station, the talk-listen switch TL at station 11 has been rendered ineffective by the opening of contact set KRB2. Thus, the calling station has assumed control over the talk-listen operation of station 11.

The invention further provides an electronic chime circuit which, when station 11 is initially coupled to audio line 13' for communication with station 12, causes an audible chime tone to be reproduced at the loudspeaker 18 thereat to announce that station 11 is coupled to audio line 13'. Also, the same electronic chime circuit is adapted to reproduce an audible chime tone at the loudspeaker 14 of station 11 when same is coupled to its own line **13*a*** and is called by another similar master station.

Essentially, the electronic chime is an audio signal tone generator defined by a simple solenoid LC which has a vibrating reed pole piece (not shown) which is magnetically attracted to the core end of solenoid LC when it is energized. If the voltage applied to energize the solenoid LC is removed, the reed will vibrate at its natural frequency and will induce a corresponding oscillating current in the solenoid coil itself which constitutes the chime signal.

When station 11 is coupled to audio line 13' for communication with station 12, and during the busy condition sampling period, a capacitor C3 is charged up to the power supply voltage through a resistor R20 via the contact set KC6 which is enclosed.

Assuming that audio line 13' is not already busy, relay KC will become de-energized at the end of the sampling period to open contact set KC6 and close contact set KC5 which had been opened. This causes the charge accumulated in a capacitor C3 to be applied to the coil of a relay KEC and also to the coil of the chime solenoid LC through a resistor R21 and contact set KEC5, the exact distribution of charge between the two being dependent upon their resistances and inductive characteristics. The resistor R21, relay KEC coil and chime solenoid LC are chosen so that relay KEC will operate on its share of charge from capacitor C3.

As a result, contact set KEC5 through which charge delivery to the chime solenoid LC occurred, is opened, thereby causing the reed associated therewith to vibrate and induce an AC chime signal voltage in the coil of solenoid LC, said chime signal being then applied to the input of amplifier 15 by the closure of contact set KEC6.

Since contact set KEC2 is opened when relay KEC operates, the base of transistor QTL will be effectively grounded, thereby placing station 11 in the talk mode of operation. Station 12 is automatically placed in the listen mode by the closure of contact set KEC1 which independently applies a −24 v. switching command signal over audio line 13' without waiting for relay KTLF to completely de-energize and restore contact set KTLF2 to the closed state. Thus, when the chime signal is being generated, station 11 is in the talk mode to transmit the chime to station 12, which is placed in the listen mode so that the chime can be heard over loudspeaker 18 thereat.

Because relay KC is locked on in the energized state when station 11 is coupled to its own line 13*a* for receiving incoming calls from other stations, so that contact set KC5 would remain open rather than closed to transfer charge from capacitor C3 to the relay KEC coil and the solenoid LC, the invention provides an independent means for energizing relay KEC and solenoid LC to effect the reproduction of a chime tone at loudspeaker 14 when station 11 is called by another station.

Recalling that under such conditions, relay KRB is energized, and that the standby switches SBB2 and SBB3 are actually changed into states opposite those shown in FIG. 2, it can be noted that prior to such change, a capacitor C4 is charged from the power supply via a series resistor R22 and switch SBB2. Upon occurrence of standby changeover, contact sets KRB4 and switch SBB2 open and contact sets KRB5 and switch SBB3 close to transfer the charge of capacitor C4 to the coil of relay KEC and the solenoid LC for chime generation purposes.

At station 11, loudspeaker 14 is connected with the output of amplifier 15 through an attenuator potentiometer R23 serving to regulate chime volume at the loudspeaker 14. This results from the fact that contact set KEC4 opens and contact sets KEC3 and KC4 are closed. Hence, the chime generated by the solenoid LC will be heard over loudspeaker 14.

It should be noted that the application of a −12 v. busy signal to the station 11 own line 13*a* will automatically produce a chime at loudspeaker 14 because such busy signal causes almost immediate operation of relay KRB which has contact sets KRB4 and KRB5 that operate to energize the chime solenoid LC and apply its chime signal to the audio amplifier 15 input. As can be appreciated from the foregoing, the invention provides a communication system 10′ having several desirable advantages and automatic operation features.

One of these advantages is to be found in the fact that operation of the communication system 10′ is substantially immune to variations in power supply output voltage and audio line resistance variations due to different length audio lines 13′, 13*a*, and 13*b*. This results from the use of a Zener diode Z1 stabilized −12 v. busy signal in combination with a full power supply −24 v. switching command signal, and from the use of Zener diodes Z0 and Z2 for discrimination between audio line DC conditions representing non-busy, busy, and switching commands. The hazard of false operation is substantially eliminated because these Zener diode clamping circuits offer a reliable "go-no go" type of DC level sensing and fixing.

For example, in the case of the transistor QTR used for controlling the talk-listen mode switching of station 12, the Zener diode Z0 could be omitted and resistors R2 and R3 chosen so that it would require −24 v. on line 27′ to trigger transistor QTR into conduction. However, such a circuit arrangement would create problems should the −24 v. power supply output vary from its rated value, and furthermore, the normal collector current versus base voltage characteristics of transistors are not as sensitive as would be desired. With a resistor R2 and R3 combination set to trigger transistor QTR into saturating current conduction upon the application of −2 v. or more to R2, and with a Zener diode Z0 having a breakdown voltage of 14 plus or minus 2 v., the switchig command voltage could fall as low as −18 v. and still effect proper operation of relay KS, and the busy signal voltage could rise as high as −14 v. without causing spurious operation of relay KS, assuming adverse Zener diode breakdown voltage tolerances in each case. However, with Zener diode Z2 being selected for a 12 v., breakdown, the busy signal could never rise to −14 v.

Consequently, the communication system 10′ is relatively free from voltage drop effects occurring over the audio lines 13′, 13*a*, 13*b*, and therefore can be used with relatively long audio lines 13′, 13*a*, 13*b* for communicating between remotely located stations 11 and 12.

In addition, as can be noted from FIG. 2, none of the relays used therein derive their operating power from a busy signal or switching command signal source connected to an audio line 13′, 13*a*, 13*b*, but rather are operated from local power supplies (not shown) with transistor switching. Accordingly, relatively little DC current need be transmitted over the audio lines 13′, 13*a*, 13*b* in order to operate the circuits which perform the talk-listen switching, chime generation, call and busy indication. This minimizes the voltage drop experienced by the busy and switching command signals over the audio lines.

From the foregoing description, it will become apparent to the artisan that the communication system of the invention is susceptible of numerous obvious variations and modifications, all within the concept of the invention, in order to suit the needs of a particular application. However, the invention is intended to be limited only by the following claims in which I have endeavored to claim all inherent novelty.

What is claimed is:

1. In an intercommunication system having at least two master stations normally in a listen condition and at least one staff station normally in a transmit condition, wherein each station:

(1) has its own audio line, defined by a pair of conductors;

(2) is adapted for reversible audio communication through a speaker;

(3) has a transmit-receive switching means associated therewith for reversing the direction of communications therethrough, said switching means being coupled to the stations own audio line for sensing a first predetermined D.C. voltage imposed thereon and being adapted to be activated thereby to reverse the audio communication direction of its station, and each of said master stations having:

(4) a first switch adapted to selectively connect its station with the audio line of any other station of the system;

(5) a command signal means adapted when its station is coupled with the audio line of a called station to impose therein said first predetermined D.C. voltage as a command signal (6) an annunciator circuit for producing an annunciator signal, and (7) a second switch adapted to place its station in a transmit condition when its station is effectively connected for communication with the audio line of another called station and to cause said command signal of its station to be imposed on the audio line of said other called station during the time said second switch is in a transmit position;

the improvement comprising:

(a) busy indicator means associated with each master station and adapted to impose continuously on the audio line of another station to which its master station may be connected a second predetermined D.C. voltage as a busy signal, which voltage is substantially lower than said first predetermined voltage, and when its master station is so connected to another station, to impose an equivalent signal on its own master station's audio line;

(b) sampling means associated with each master station and adapted to determine when said first switch means of its master station is activated to connect with the audio line of another station whether a voltage at least equivalent to said second predetermined voltage exists on such audio line, and (i) on the sensing of a voltage thereon at least equivalent to said second predetermined D.C. voltage to lock out its own station from connecting to such audio line despite the position of said first switch, and (ii) in the absence of a voltage thereon at least equivalent to said second predetermined voltage to place its master station in transmit and cause said annunciator signal to be applied to such audio line for a brief finite period of time, and immediately thereafter to place its master station in receive and cause the busy signal of its master station to be applied to such audio line, whereby after said first switch of a master station has been activated to connect with the audio line of a called station and such master station after sampling the same with effective connection being made for communication and the busy signal of the calling master station is imposed on the audio line of the called station, the calling station can transmit by activation of said second switch of such master station and can receive by reversal of the same, without interruption by another master station applying a voltage to the audio lines of no more than said first predetermined D.C. voltage.

2. The intercommunication system of claim 1 wherein each master station has means responsive to a priority command signal and adapted to disconnect its station from communication with the audio line of any other station with which it may be in communication and at least one of said master stations has priority command signal means for imposing on the audio line of any other station to which it may be connected a third predetermined D.C. voltage as a priority command signal, which voltage is substantially higher than said first predetermined D.C. voltage.

3. The intercommunication system of claim 1 wherein said sampling means when it senses a voltage at least equivalent to said second predetermined voltage as a busy condition on an audio line to which its station may be connected permits its station to remain camped on the line until such time as said busy condition ceases, after which it places its own station on such line.

4. The intercommunication system of claim 1 wherein said transmit-receive switching means includes a Zener diode having a breakdown voltage greater than said second predetermined D.C. voltgae but less than said first predetermined voltage.

References Cited

UNITED STATES PATENTS

| | | | |
|---|---|---|---|
| 3,215,781 | 11/1965 | Yong. | |
| 2,958,730 | 11/1960 | Myers | 179—1 |
| 3,030,446 | 4/1962 | Briggs | 179—1 |
| 3,215,780 | 11/1965 | Beszedics et al. | 179—1 |
| 3,321,580 | 5/1967 | Horne et al. | 179—1 |

KATHLEEN H. CLAFFY, Primary Examiner

JAN S. BLACK, Assistant Examiner

U.S. Cl. X.R.

179—37

PO-1050
(5/69)

UNITED STATES PATENT OFFICE
CERTIFICATE OF CORRECTION

Patent No. 3,499,115 Dated March 3, 1970

Inventor(s) HOWARD M. SONTAG

It is certified that error appears in the above-identified patent and that said Letters Patent are hereby corrected as shown below:

Column 3, line 6, before "multi-station" insert --a--; column 12, line 13, "signal" should be --signals--; column 13, line 21, "and" (second occurrence) should be --in--; column 15, line 66, "switchig" should be --switching--

SIGNED AND
SEALED
JUL 21 1970

(SEAL)
Attest:

Edward M. Fletcher, Jr.
Attesting Officer

WILLIAM E. SCHUYLER, JR.
Commissioner of Patents